Oct. 10, 1933.        F. ELLINGER        1,929,682

ROASTER

Filed Feb. 12, 1932

INVENTOR.
Flora Ellinger,
BY
Morsell & Morsell
ATTORNEYS.

Patented Oct. 10, 1933

1,929,682

UNITED STATES PATENT OFFICE 1,929,682

ROASTER

Flora Ellinger, Milwaukee, Wis.

Application February 12, 1932. Serial No. 592,457

5 Claims. (Cl. 53—6)

This invention relates to roasters for use in the culinary art.

It is one of the objects of the present invention to provide a vessel fitted with shiftable and rearrangeable containers and compartments whereby an entire meal, to be prepared, may be disposed within the roasting vessel which in turn is disposed within an oven to permit of the simultaneous cooking of the entire meal contained within the single roasting vessel.

A further object of the invention is to provide a roaster for the preparation of food which will result in material savings in fuel, time and labor.

A further object of the invention is to provide a roaster including a large main vessel and inner containers, the arrangement being such that each inner container receives a certain food to keep the various foods separated during the cooking operations but all of the food filled inner containers being disposed within the main vessel for economy in space and permitting the consumed fuel, for the cooking, to serve for all.

A further object of the invention is to provide a cooking vessel adapted for the simultaneous cooking of contained vegetables and puddings as well as a roast of fowl or meat.

A further object of the invention is to provide a cooking vessel fitted with individual inner containers which may be arranged within the main vessel in various formations and dispositions depending on the size and location of the main roast therewithin, in order to insure the maximum capacity for the cooking vessel proper.

A further object of the invention is to provide a cooking vessel fitted with individual containers of triangular cross-section, which containers, as shaped, may be disposed within corner portions of the main vessel to conserve space and for compactness, and which may also be stacked within the main vessel.

A further object of the invention is to provide a container, for cooking purposes, so constructed that various kinds of food may, at the same time, be cooked, boiled, roasted or broiled therein, without danger of intermingling of the flavors of the various individual foods, but at the same time preserving all of the nutrient of the various foods.

A further object of the invention is to provide a container for cooking purposes arranged to permit the preparation of the various foods for a complete meal with the disposition of each food into a separate individual vessel, whereupon all of the individual vessels are conveniently and compactly disposed within the main container which is then put into a cooking oven and no more attention is required until the cooking period has elapsed.

A further object of the invention is to provide a roaster which is sanitary and easy to keep clean, is efficient and economical in use, is strong and durable, and is well adapted for the purposes set forth.

With the above and other objects in view the invention consists of the improved roaster, and its parts and combinations as set forth in the claims, and all equivalents thereof.

In the accompanying drawing in which the same reference characters indicate the same parts in all of the views.

Figure 1:
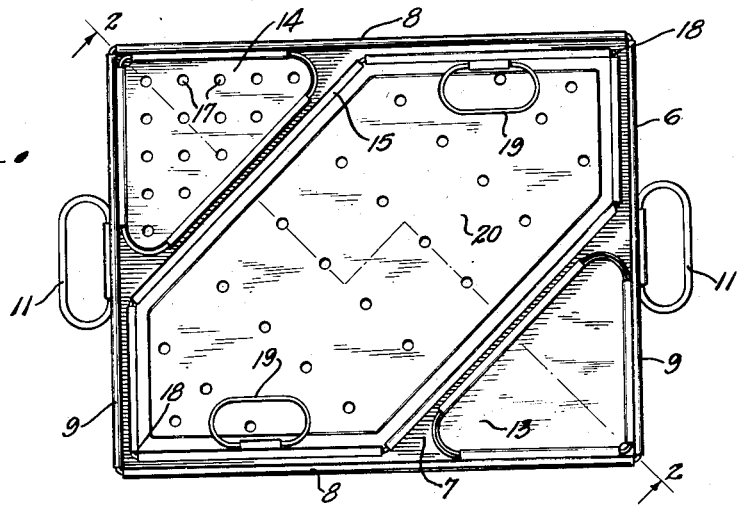
Fig. 1 is a plan view of the improved roaster or cooking vessel with the cover removed and with certain containers arranged therein in a compact disposition.

Referring now more particularly to the drawing it will appear that the numeral 6 indicates the main vessel of the roaster, which vessel is formed of sheet metal in five sided form having a bottom 7, vertical sides 8 and vertical ends 9, the upper edges of the sides and ends being rolled to removably receive a cover 10. The vessel 6, in horizontal section, is rectangular in shape. Handles 11 are affixed to upper portions of the ends 9 for convenience in carrying and lifting the vessel.

Figure 2:
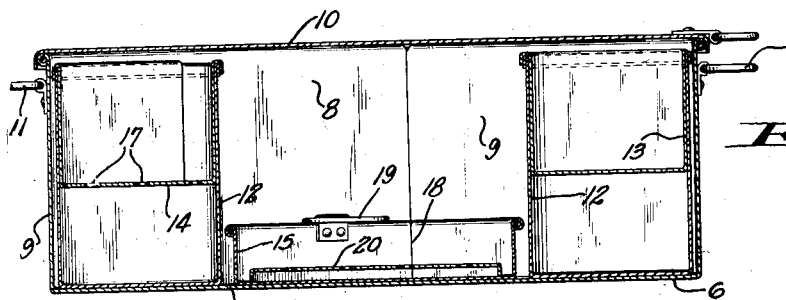
Fig. 2 is a vertical sectional view taken on line 2—2 of Fig. 1 and with the cover in place.
Figure 4:
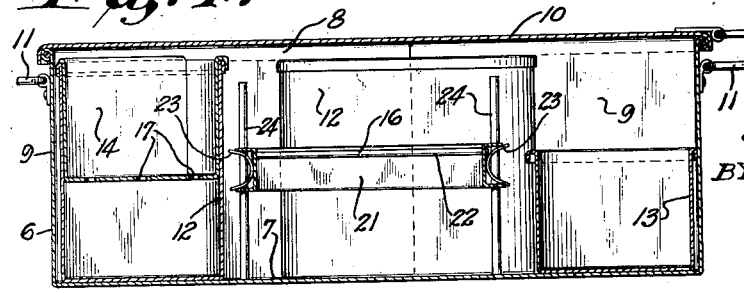
Fig. 4 is a vertical sectional view taken on line 4—4 of Fig. 3.

Adapted to coact with the interior of the main vessel are a plurality of classes of individual containers and roast supports. Said classes of containers and supports include deep containers 12, lower containers 13, perforated inserts 14, a large roast container 15, and a smaller adjustable roasting grill 16. There may be any desired number of containers in each class furnished with the cooking device. All of the containers 12, 13 and 14 are shaped in horizontal section in the form of triangles, and in addition to the side walls, said containers have flat bottom portions and open upper end portions, the upper edges of the sides being rolled. The bottom portions of the inserts 14 are provided with spaced-apart perforations or apertures 17. The deep containers 12 are of a height or depth slightly less than that of the main vessel 6, while the containers 13 and 14 are somewhat lower and the outside dimensions of the containers 13 and 14 are slightly less than those of the containers 12, whereby some of the containers 13 and 14 may be stacked within some of the containers 12, as shown in Figs. 2 and 4, especially adapting the same for the steaming of foods. When a container 13 or 14 is stacked within a container 12 the stacked container is supported spacedly above the bottom of the container 12 by means of the engagement of the upper peripheral rolled flange of the container 13 or 14 on the flange of the supporting container 12.

The large roast container 15 is in the form of a shallow, elongated pan provided with right angular end portions. Said container 15 is adapted to be positioned diagonally within the main vessel 6 with the apexes 18 of the right angular end portions lodged within diagonally opposed corner portions of the main vessel. Opposed side portions of the roast container 15 are provided with handles 19, and a perforated tray or insert 20, corresponding in contour to the contour of the container 15, is placed therewithin.

The small roasting grill 16 is substantially square in contour and consists of an angled frame 21 which supports spaced-apart grill rods 22. The frame, at the corners thereof, carries spring clips 23. Each spring clip is formed with a pair of spaced vertically alined apertures through which a supporting leg 24 is adjustably extended. The frame is held in adjusted position on all of the legs 24, at a desired elevation, by reason of frictional engagement between the spring clips and legs.

It is obvious that many of the various containers and supports may be compactly arranged within the main vessel 6 in many different desirable formations and groupings. Figs. 1 and 2 illustrate one typical and convenient grouping arrangement while another typical grouping arrangement is disclosed in Figs. 3 and 4. Besides these arrangements illustrated many other arrangements, within the scope of the invention, may be achieved. With respect to the arrangement in Figs. 1 and 2 the large roast support 15 is utilized for the purpose of holding for roasting a large fowl or roast, and said member 15 is diagonally disposed. Adjacent one side thereof and in one corner of the main vessel is a deep container 12 in which is stacked a perforated insert 14, and in the diagonally opposed corner of the main vessel 6 is another deep container 12 having nested therein a shallower container 13.

With this disposition of the containers an entire meal may be cooked within the main vessel 6. For instance, a turkey may be held by the member 15, vegetables may be disposed within the lower portions of containers 12, rice or another food may be within insert 14, and a pudding may be in the nested container 13. For cooking operations it is desirable to have about an inch of water within the main vessel 6, and then the main vessel, with everything contained therein, and covered, is placed within an oven and left for the desired period. The fuel consumed serves for the cooking of all of the food and a minimum of attention is required.

Figure 3:
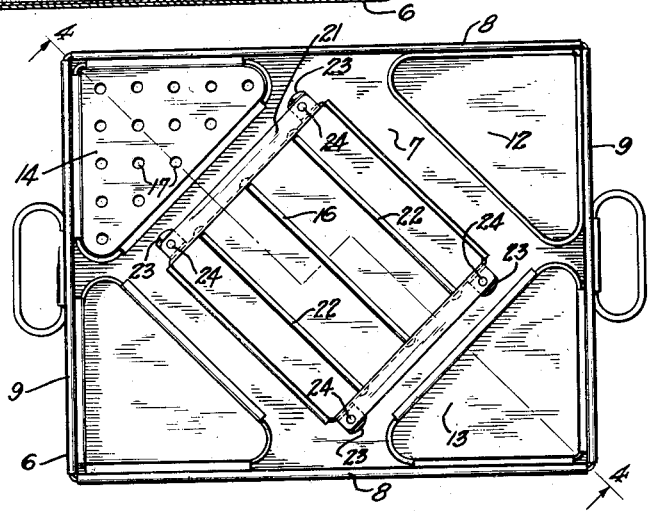
Fig. 3 is a view similar to Fig. 1 only showing a different roast supporting member in the vessel and a different arrangement of some of the other containers.

In the typical arrangement shown in Figs. 3 and 4 the small roasting grill is utilized for a small meat roast or fowl, and said grill is disposed centrally within the main vesesl 6, only turned at an angle of forty-five degrees with respect to the disposition of the main vessel, thereby providing between the sides of the grill and the side and end walls of the main vessel, four substantially triangular spaces. These spaces are filled by the desired containers, as shown, and a very compact arrangement results.

Obviously the main vessel 6 may be of such a size and so proportioned as to fit conveniently and compactly into the oven in which it is to be utilized. Correctly proportioned, the vessel will leave no substantial amount of waste space within the oven and due to the construction of the vessel and the disposition of a proper level of water therein, enough steam will be generated to do any type of cooking or boiling, and the arrangement is further such that sufficient hot air may circulate to roast or broil any kind of meat or fowl within the vessel or container.

By way of example, if it is desired to cook a chicken for soup wherein one quart of soup or broth is desired, one quart of water is initially introduced into the vessel with the chicken, and at the end of the required cooking period, when the chicken is done, there will be one quart of clear broth, and during the cooking period no attention whatsoever was required. Fruits may be cooked with little or no water, and rice, cereals, and the like are cooked without danger of burning, requiring no attention, and with no danger of boiling over. Foods cooked in any way in the improved cooking device retain their delicious natural flavors and are considerably more palatable than foods cooked the ordinary way or in any of the well known types of fireless or waterless cookers.

From the foregoing description it will be seen that the improved roaster or cooking vessel is of very simple and novel construction, and is well adapted for the purposes set forth.

What is claimed as the invention is:

1. A cooker, comprising a large rectangular vessel, a pan positioned diagonally therewithin and shaped to fill a pair of diagonally opposed corner portions of the vessel but forming triangular spaces between it and the other corner portions of the vessel, and a triangular container within each of said spaces.

2. A cooker, comprising a large vessel of polygonal contour adapted to be partially liquid filled, a polygonal roast support removably positioned therewithin and having side portions thereof spaced from and in non-parallel disposition to side portions of the vessel, a cooking container of triangular formation removably positioned in and substantially filling a space between some of said sides of the vessel and support, said container having its sides parallel to the vessel or support sides immediately thereadjacent, and a shallower container of triangular formation removably nested within said first-mentioned cooking container.

3. In combination, a large sheet metal vessel of rectangular form and having an open top portion, a polygonal tray having right angular end portions and parallel sides positioned diagonally within said vessel with its right angular end portions extending into diagonally opposed corner portions of the vesesl, a triangular container positioned within another corner portion of the vessel between the wall portions forming the corner and a side of the tray, another container nested within the first container, and a cover for the vessel and covering all of the members therewithin.

4. A cooker, comprising a large vesesl of polygonal contour adapted to be partially liquid filled, a polygonal roast support removably positioned therewithin and having side portions thereof spaced from and in non-parallel disposition to side portions of the vessel, and a cooking container of triangular formation removably positioned in and substantially filling a space between some of said sides of the vessel and support, said container having its sides parallel to the vessel or support sides immediately thereadjacent.

5. In combination, a large sheet metal vessel of rectangular form having an open top portion, a polygonal tray having right angular end portions and parallel sides positioned diagonally within said vessel with its right angular end portions extending into diagonally opposed corner portions of the vessel, a triangular container positioned within another corner portion of the vessel between the wall portions forming the corner and a side of the tray, and a cover for the vessel and covering all of the members therewithin.

FLORA ELLINGER.